(12) United States Patent
Perner et al.

(10) Patent No.: US 8,801,331 B2
(45) Date of Patent: Aug. 12, 2014

(54) TIDAL POWER PLANT AND METHOD FOR THE CREATION THEREOF

(75) Inventors: Norman Perner, Neu-Ulm (DE); Wolfgang Maier, Nattheim (DE); Alexander Sauer, Heidenheim (DE); Benjamin Holstein, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/503,700

(22) PCT Filed: Sep. 15, 2010

(86) PCT No.: PCT/EP2010/005655
§ 371 (c)(1),
(2), (4) Date: Jul. 20, 2012

(87) PCT Pub. No.: WO2011/050882
PCT Pub. Date: May 5, 2011

(65) Prior Publication Data
US 2012/0272614 A1 Nov. 1, 2012

(30) Foreign Application Priority Data
Oct. 30, 2009 (DE) .......................... 10 2009 051 425

(51) Int. Cl.
| | | |
|---|---|---|
| *E02D 27/52* | (2006.01) | |
| *E04H 12/22* | (2006.01) | |
| *F03B 13/26* | (2006.01) | |
| *F03D 11/04* | (2006.01) | |
| *E02D 27/42* | (2006.01) | |
| *F03D 1/00* | (2006.01) | |

(52) U.S. Cl.
CPC ............. *F03B 13/264* (2013.01); *Y02E 10/728* (2013.01); *Y02E 10/727* (2013.01); *F03D 11/04* (2013.01); *F05B 2240/90* (2013.01); *Y02E 10/38* (2013.01); *E02D 27/42* (2013.01); *F05B 2240/95* (2013.01); *E02D 27/52* (2013.01); *F03D 1/001* (2013.01); *F03D 11/045* (2013.01); *F05B 2240/97* (2013.01); *Y02E 10/28* (2013.01); *F05B 2240/91521* (2013.01); *Y10S 416/06* (2013.01)
USPC ............... 405/204; 405/76; 405/224; 52/296; 52/848; 52/745.17; 52/745.18; 416/DIG. 6

(58) Field of Classification Search
USPC ........... 52/223.4, 223.5, 848, 745.17, 745.18, 52/296; 405/76, 204, 224; 416/244 R, 416/DIG. 6
See application file for complete search history.

(56) References Cited

U.S. PATENT DOCUMENTS 5,213,470 A    5/1993  Lundquist
6,157,088 A *  12/2000 Bendix .......................... 290/55

(Continued)

FOREIGN PATENT DOCUMENTS

DE        102 39 278       7/2004
DE    10 2008 000 382      9/2009

(Continued)

*Primary Examiner* — Robert Canfield
(74) *Attorney, Agent, or Firm* — Farjami & Farjami LLP

(57) ABSTRACT

The invention relates to a tidal power plant, comprising a turbine, which rotates on a carrying element; a foundation structure, on which the carrying element is supported on at least one coupling device, an upper part of the coupling device that is part of the carrying element being detachably operatively connected to a lower part of the coupling device that is part of the foundation structure in the installed state, wherein the invention is characterized in that the carrying element is individually adapted to the orientation of the lower part of the coupling device existing after the foundation structure has been created.

20 Claims, 4 Drawing Sheets

(56) References Cited

U.S. PATENT DOCUMENTS

| | | | |
|---|---|---|---|
| 8,359,798 B2* | 1/2013 | Armbrecht et al. | 52/297 |
| 2003/0012751 A1 | 1/2003 | Hoeffkes et al. | |
| 2005/0286979 A1* | 12/2005 | Watchorn | 405/224 |
| 2008/0056906 A1* | 3/2008 | Gray et al. | 416/244 R |
| 2009/0000227 A1* | 1/2009 | Jakubowski et al. | 52/223.4 |
| 2009/0169393 A1* | 7/2009 | Bagepalli et al. | 416/248 |
| 2009/0211174 A1* | 8/2009 | Henderson et al. | 52/40 |
| 2011/0138730 A1* | 6/2011 | Nies | 52/651.01 |
| 2011/0316282 A1* | 12/2011 | Holstein et al. | 290/54 |
| 2012/0091725 A1* | 4/2012 | Yoshida et al. | 290/55 |
| 2012/0137622 A1* | 6/2012 | Patterson et al. | 52/651.01 |
| 2012/0189390 A1* | 7/2012 | Belinsky et al. | 405/204 |
| 2012/0228878 A1* | 9/2012 | Perner et al. | 290/54 |
| 2012/0286518 A1* | 11/2012 | Arlitt et al. | 290/54 |
| 2012/0294681 A1* | 11/2012 | Wong et al. | 405/224 |
| 2013/0001954 A1* | 1/2013 | Maestre et al. | 290/55 |
| 2013/0009405 A1* | 1/2013 | Sato et al. | 290/55 |
| 2013/0101359 A1* | 4/2013 | Maier | 405/224 |

FOREIGN PATENT DOCUMENTS

| | | | |
|---|---|---|---|
| EP | 1 366 287 | | 12/2006 |
| GB | 2 394 498 | | 8/2006 |
| JP | 2009281288 A | * | 12/2009 |
| WO | WO 03/098038 | | 11/2003 |
| WO | WO 2004/015207 | | 2/2004 |
| WO | WO 2007/083105 | | 7/2007 |

* cited by examiner

TIDAL POWER PLANT AND METHOD FOR THE CREATION THEREOF

This is a U.S. national phase application, which is based on, and claims priority from, PCT application Serial No. PCT/EP2010/005655, filed Sep. 15, 2010, which claims priority from foreign application Serial No. 10 2009 051 425.2, filed Oct. 30, 2009, in Germany.

BACKGROUND

The invention relates to a tidal power plant and a method for the creation thereof.

The tidal power plants as discussed herein are driven by a watercourse or a flow of air or a tidal flow. Wind power plants and tidal power plants arranged in a conceptually respective manner are known. A typical configuration provides a propeller-like turbine which revolves with a horizontal rotational axis on a machine nacelle in which an electric generator is disposed which is driven by the turbine shaft. The machine nacelle is erected on a tower above a foundation structure. Vertical-axis rotors such as Darrieus rotors represent modifications for example. Furthermore, turbines can be housed in a jacket housing with the effect of a Venturi nozzle especially for utilizing slow tidal flows and can be mounted via a radially outer support frame. Such installations represent variants of generic tidal power plants which are considered in the present application.

The erection of large-size wind or tidal power plants is a challenge especially for an offshore location with a sunk foundation structure. One of the difficulties relates to the centering of the foundation structure in order to place a machine nacelle on a coupling apparatus on the foundation structure in such a way as described in EP 1 366 287 B1 that the rotational axis of the turbine lies in a predetermined operating area. If foundations for forming the foundation structure are cast on site, centering can not always be ensured with the required precision. This is all the more true when concrete elements prefabricated in dry docks are sunk for forming the foundation structure at the place of installation. Even in the case of a careful preparation of the seabed there is often the necessity for correcting the centering.

A pile-like structure which is mostly a steel tube is rammed into the ground at first at the installation location for a monopile foundation. A centering error will usually occur in this process, so that an external tube of a larger diameter is placed and aligned on the same for vertical orientation. The intermediate space between the rammed pile and the external tube will be filled with cement in order to produce a so-called grout connection. The disadvantageous aspect of this foundation variant is the high amount of installation work. Furthermore, several monopiles are usually necessary for large-size tidal power plants, on which a supporting platform will then be erected.

An inexpensive alternative for the formation of a foundation structure is provided by gravity foundations made of concrete. They can be prefabricated at the dock in their entirety or as partial components and can be dragged as floating units to the place of installation and can be sunk there. Corrective elements are proposed for the correction of an angular position of such a foundation structure by DE 10 2008 000 382 A1, which corrective elements respectively consist of a paired sequence of cylindrical elements with obliquely beveled contact surfaces. By twisting two successively following elements, there will be a bend in the stack sequence which allows centering the longitudinal axis of the stack in relation to the perpendicular. The disadvantageous aspect in this approach is that it is necessary to perform the relative positioning of the corrective bodies at the installation location on the ground of the sea. Furthermore, their position needs to be fixed in a secure manner, which proves to be difficult as a result of the obliquely disposed contact areas and the resulting elliptical borderings of the corrective bodies.

The setting down of a foundation structure on the seabed for a tidal power plant is further described in WO 2007/083105 A1, with draw works being provided on the foundation for centric orientation. Such an approach increases the complexity of installation however. Furthermore, concentrated loads will be generated in the region of the draw works on the foundation, for which the foundation structure needs to be configured. It is a further problem that over time the support points of the foundation will yield in the region of the draw works as a result of erosive processes, thus leading to changes in the position and orientation of the foundation structure. A further variant for centering a bottom tower part on a tripod disposed obliquely on the seabed for forming a tidal power plant is described by WO 2004/015207 A1. It is disadvantageous that the corrective steps need to be performed on-site and dangerous diving work is necessary.

SUMMARY

The invention is based on the object of overcoming the aforementioned difficulties by providing a further developed tidal power plant, with the rotational axis of the turbine being disposed in a predetermined operating area also for an obliquely disposed foundation structure. The mounting method for erecting such an installation shall especially reduce the time limit for the installation steps to be performed on-site. Furthermore, a substantially automated installation shall be enabled.

The object underlying the invention will be achieved by the features of the independent claims. The inventors have recognized that an angular position of a foundation structure set down at the installation location or erected there can be corrected by individual adjustment, i.e. by a configuration specific to each installation, of the part of the installation that is placed thereon, referred to hereinafter as a carrying element.

For a first embodiment of the invention, there will be an adjustment of the upper part of the coupling apparatus which is a part of the carrying element. An advantageous configuration provides the arrangement of the upper part of the coupling apparatus as a concrete composite part, with a coupling body which is preferably made of a metal which is non-corrosive in seawater such as special steel being placed in a formwork with an angular position which corresponds to the orientation of the counterpart on the foundation structure and is cast in with concrete.

The individual adjustment of the carrying element is performed in a partial area which is remote from the coupling apparatus for a second embodiment of the invention. This can be the connecting point between the machine nacelle and the upper section of the supporting pillar. The longitudinal axis of the machine nacelle which is in orientation with the rotational axis of the turbine is placed at a predetermined angle in relation to the longitudinal axis of the upper supporting pillar section which compensates an angular position of the foundation structure. The carrying element will advantageously be arranged as a concrete composite part, so that as a result of an adjustable formwork the desired individual adjustment of the carrying element will be produced.

When setting down the carrying element which is adjusted in this way in its entirety on the foundation structure, the upper part and the bottom part of the coupling apparatus need to assume a specific relative angle during the installation, for which the aforementioned angular position correction is designed. This angle will be fixed by an anti-rotation element which is arranged as a multiple toothing on the upper and bottom part.

BRIEF DESCRIPTION OF THE DRAWINGS

The invention will be explained below in closer detail by reference to embodiments shown in the drawings, wherein.

DETAILED DESCRIPTION

Figure 1:
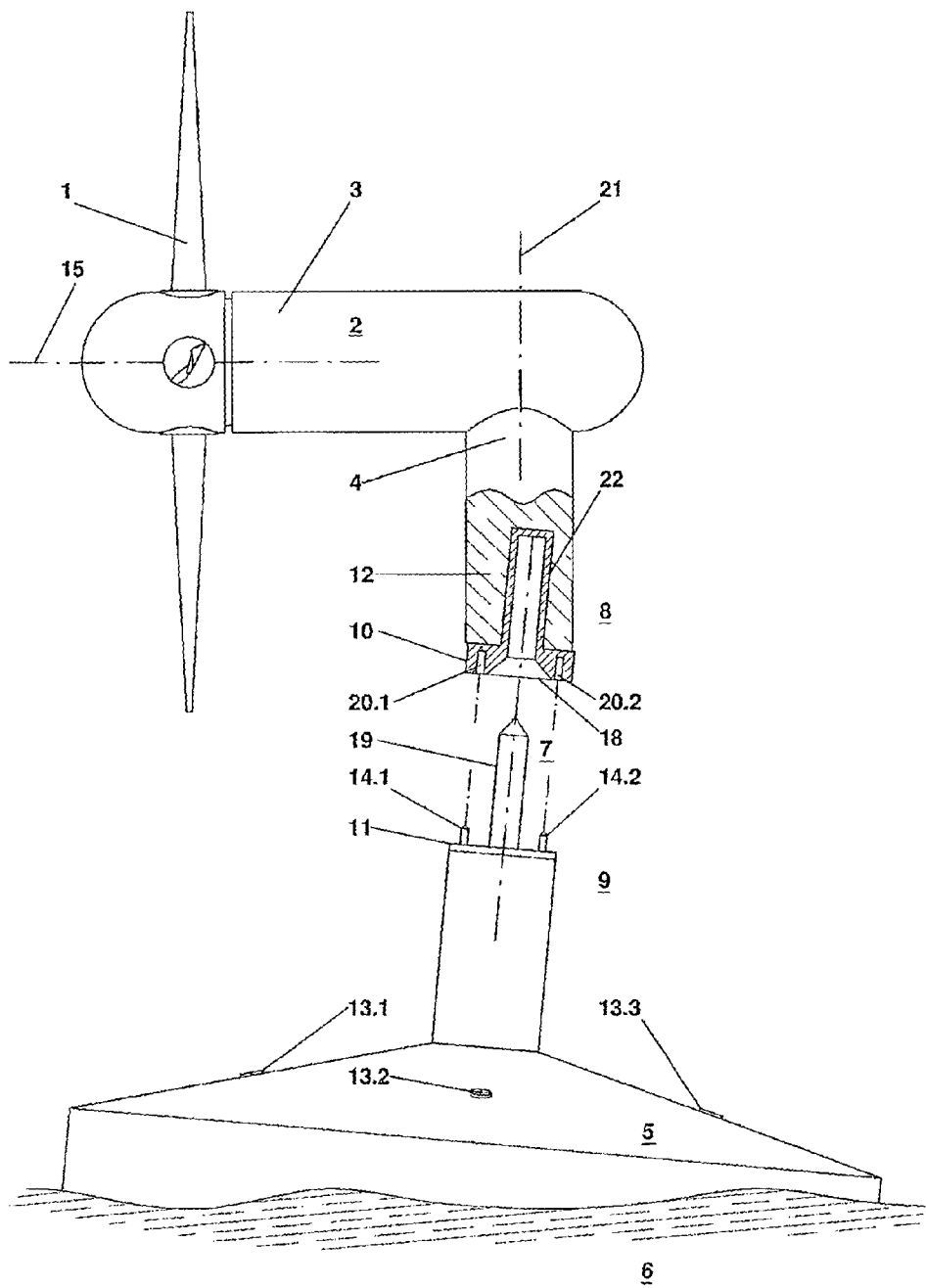
FIG. 1 shows a partly sectional side view of a tidal power plant in accordance with the invention.

FIG. 1 outlines a foundation structure 5 which has been set down on the seabed 6. A carrying element 2 with a turbine 1 revolving thereon is placed on said structure during installation by means of a coupling apparatus 7. A turbine with a horizontal rotational axis 15 is used for the illustrated embodiment. The carrying element 2 further comprises for the present embodiment a machine nacelle 3 and an upper supporting pillar section 4. The machine nacelle 3 is used for bearing the turbine shaft and for accommodating an electric generator (not shown in detail). In the present case, the term of a carrying element 2 is used in a generalized manner. Embodiments are possible for which the carrying element 2 is arranged in several parts. Furthermore, partial components of the carrying element 2 can be moved relative to one another, especially for forming an azimuth rotary joint.

The starting point of the invention is a foundation structure 5 with an angular position. In this respect, FIG. 1 shows the bottom part 9 of the coupling apparatus 7 associated with the foundation structure 5 with an angular position against the vertical direction 21 which is shown in an excessive manner for reasons of illustration. The orientation of the centering pin 19 on the bottom part 9 is relevant for the coupling function and the orientation. It is provided according to the invention that the counterpart on the upper part 8 of the coupling apparatus 7 which is associated with the carrying element 2 and comprises a first coupling body 10 with a centering bushing 22 is adjusted individually to this angular position.

An interlocking connection is assumed in this case between a first coupling body 10 on the upper part 8 and a second coupling body 11 on the bottom part 9. In addition, two receivers 20.1, 20.2 are additionally present on the first coupling body 10 to the side of the centering bushing 22. The securing elements 14.1, 14.2 on the second coupling body 11 of the bottom part 9 engage in the same when forming the coupling, i.e. in the mounted state of the coupling apparatus 7, which securing elements are used as an anti-rotation element. They are also adjusted individually to the predetermined position of the securing elements 14.1, 14.2.

Furthermore, the first coupling body 10 comprises a conical catching area 18 on the centering bushing 22 on the input side, so that the tapering centering pin 19 in the end region can be inserted securely on the second coupling body 11 of the bottom part 9 during mounting. The conical catching area 18 is arranged in such a way that during a movement of the carrying element 2 parallel to the axis of the centering pin 19 an interlocking connection of the upper part 8 and the bottom part 9 of the coupling apparatus 7 is produced starting from an initial position close to the tip of the centering pin 19.

Furthermore, the invention can comprise an alternative configuration for the coupling apparatus 7, for which no interlocking connection is provided between the upper part 8 and the bottom part 9. An operative connection may be provided which is based additionally or alternatively on a non-positive and/or frictionally engaged connection. Principally, an operative connection of flanges with screwed joints for forming the coupling apparatus can be considered insofar as there are guides for aligning the upper part 8 and the bottom part 9 for performing the installation. In this case too, the upper part 8 is preferably adjusted to the position of the bottom part 9 of the coupling apparatus 7 which is provided after forming the foundation. Furthermore, the operative connection is preferably arranged in a detachable way, so that the carrying element 2 with the turbine 1 can be removed for an inspection.

Figure 2:
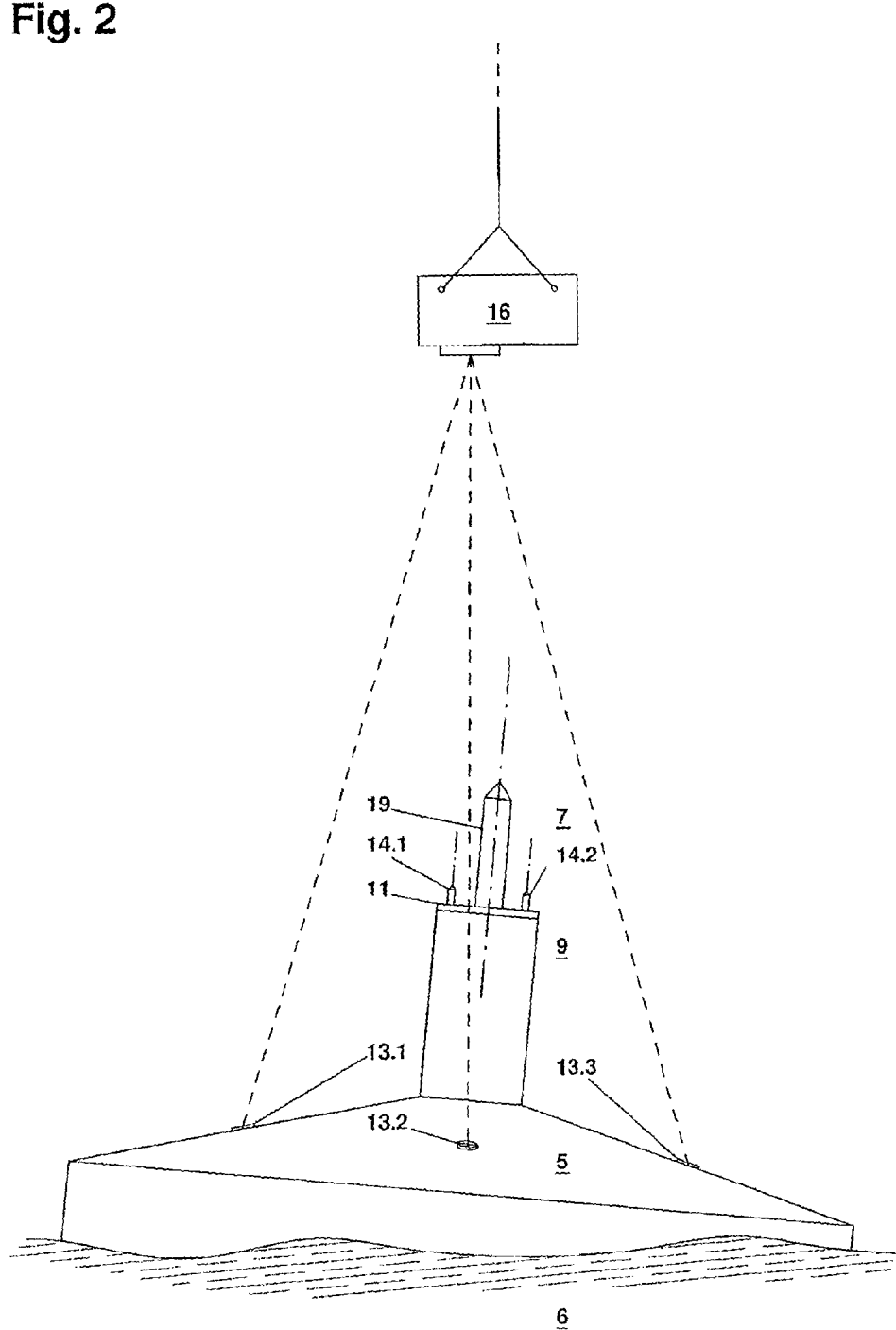
FIG. 2 shows the measurement of the orientation of the foundation structure for performing the installation method in accordance with the invention.

For the purpose of performing the individual adjustment of the upper part 8 of the coupling apparatus 7, the foundation structure 5 will be measured at first after production. This procedure is shown in FIG. 2. A measuring probe 16 can be used for this purpose for example which determines the position of several measuring points 13.1, 13.2, 13.3 which are attached to the foundation structure 5 and whose positions are known. An optical measuring method or a measuring principle based on triangulation can be used for this purpose.

Figure 3:
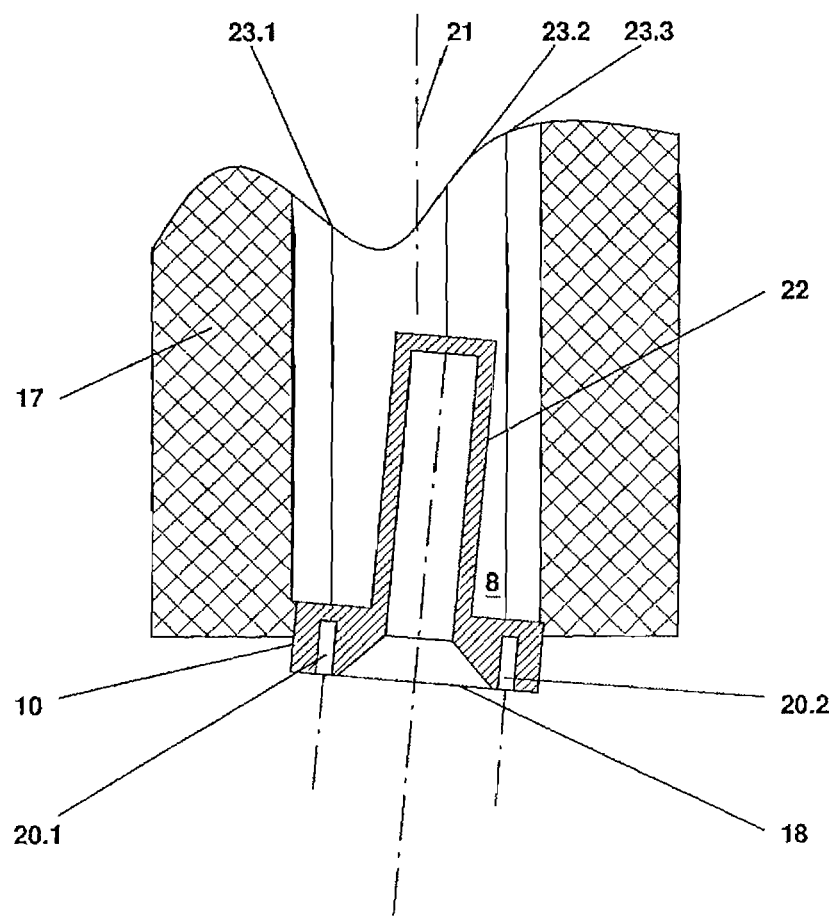
FIG. 3 shows the production of an individually adjusted upper part of the coupling apparatus as a concrete composite part.

The upper part 8 of the coupling apparatus which is associated with the support element 2 is arranged as a composite concrete part 12 for an advantageous embodiment of the invention. On the basis of the measured orientation of the bottom part 9, the individual adjustment is achieved by an orientation of a first coupling body 10 of the upper part 8 in a formwork 17 with subsequent casting in concrete. This method step is shown in FIG. 3. The first coupling body 10 can be arranged in different ways. With respect to the choice of material, a metallic material which is corrosion-proof in a sea water environment is preferred. Accordingly, special steel or bronze can be chosen. Accordingly, the forces acting on the coupling apparatus 7 during the installation and the operation of the installation and the abrasive effect caused by the relative effects of the individual components can be intercepted securely. Furthermore, the introduced point loads in the composite concrete part 12 will be distributed in a secure manner, with the reinforcement originating advantageously from the first coupling body 10 or from the second coupling body 11 being oriented in the direction of the power flow. Furthermore, tensile elements can originate from the first coupling body 10 from the second coupling body 11 which are not shown in detail and which pretension the adjacent concreted areas.

In the case of a location under water and especially an installation location in the sea, a concrete material is used for forming the upper part 8 of the coupling apparatus 7 as a composite concrete part which is seawater-proof. Furthermore, a fiber-reinforced concrete is preferable, with glass or carbon fibers or fibers made of plastic or steel being used as a fibrous aggregate for the concrete. Furthermore, additives can be added to the concrete as anticorrosive agents. In addition, the outside surface of the concrete parts can be coated with a coat of paint. Furthermore, the highly loaded concrete parts shall be pretensioned. A reinforcement originating from the first coupling body 10 is shown in FIG. 3. Furthermore, tie rods 23.1, 23.2, 23.3 can further be provided, which lead up to tensioning pockets on the carrying element 2 which are not shown in detail. Furthermore, at least parts of the carrying element 2 can be formed by floating concrete parts.

The entire carrying element 2 including the machine nacelle 3 consists of a composite concrete part 12 for an especially advantageous embodiment. This enables an especially cost-effective production, wherein constructively uniform units with an identical formwork can be produced for the carrying element 2 and the adjustment of the upper part 8 of the coupling apparatus 7 is aimed exclusively at the orientation of the first coupling body 10 within the formwork 17 which is adjusted to the respective foundation structure 5.

Figure 4:
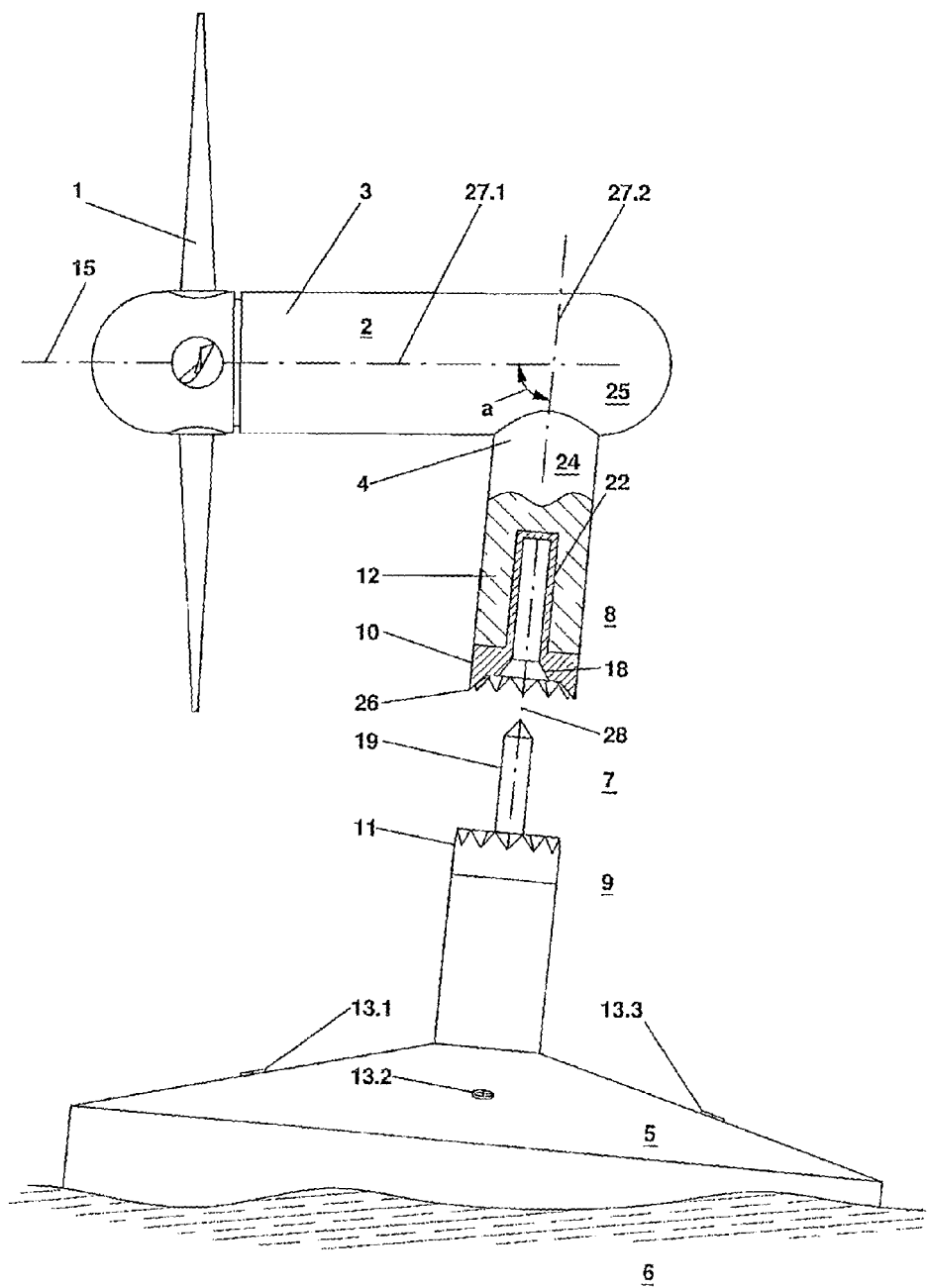
FIG. 4 shows an alternative embodiment of a tidal power plant in accordance with the invention in a partly sectional side view.

FIG. 4 shows an alternative embodiment of the invention as a partly sectional side view. The individual adjustment of the carrying element 2 is not made in the region of the coupling apparatus 7. Instead, the angle a between a first partial component 24, which in the present case is the upper support pillar section 4, and a second partial component 25, which is the machine nacelle 3 in the illustrated case, of the carrying element 2 is adjusted to the angular position of the foundation structure 5. It is shown that the longitudinal axis 27.1 of the second partial component 25 assumes an angle a in relation to the longitudinal axis 27.2 of the first partial component 24 which is smaller than 90°, with the angular difference to 90° corresponding to the angular deviation to the vertical of the centering pin 19 on the bottom part 9.

At least the connecting point between the first partial component 24 and the second partial component 25 is arranged as a composite concrete part for the constructively simple and cost-effective arrangement of the variant of the invention according to FIG. 4. The arrangement of the entire carrying element 2 in form of a composite concrete part is preferable however. In this case, the first coupling body 10 of the upper part 8 of the coupling apparatus can be inserted with similarly remaining orientation in a formwork part which can assume an individually adjustable angular position in relation to a second formwork part for casting the second component 25. This is not shown in closer detail in the drawings.

FIG. 4 further shows a constructively simplified anti-rotation device 26, for which a multiple toothing is provided on the upper part 8 of the coupling apparatus 7. A complementary multiple toothing is disposed on the bottom part 9. As a result, the carrying element 2 can be aligned at first for the installation in such a way in relation to the centering pin 19 that it enters the centering bushing 22 via the conical catching area 18, so that the longitudinal axis of the centering pin 19 and the longitudinal axis 27.2 of the second partial component 25 will overlap one another. In this first section of the installation, the carrying element 2 can still perform a rotational movement about the rotational axis 28 which coincides with the longitudinal axis of the centering pin 19. As a result of this degree of rotational freedom, an orientation of the installation according to the individual adjustment of the carrying element 2 which is factory-installed via the angle a can be performed accordingly. The setting down of the carrying element 2 on the foundation structure 5 will then be performed for the provided relative angular position, so that the multiple toothings will engage into each other.

In order to refine this principle, dissymmetries can be installed in the multiple toothings in the upper part 8 and the bottom part 9, so that engagement is only possible in a specific relative position. Further embodiments will use complementary parts which engage into one another according to the key-and-lock principle for coupling the upper part 8 and the bottom part 9. Furthermore, a pairing of first coupling body 10 and second coupling body 11 in form of a multi-tooth pin and a respectively interlocking recess in the counterpart or other interlocking engaging components can be provided for this purpose. It is further possible to produce the function of parallel centering of upper part 8 and bottom part 9 and the anti-rotation device by spatially separated, separately provided components.

Further embodiments of the invention are possible within the scope of the following claims. It is possible that the carrying element comprises several upper support pillar sections 4 and several coupling apparatus 7, so that a plurality of upper parts 8 are adjusted in a manner specific to the installation.

LIST OF REFERENCE NUMERALS

1 Turbine
2 Carrying element
3 Machine nacelle
4 Upper support pillar section
5 Foundation structure
6 Seabed
7 Coupling apparatus
8 Upper part
9 Bottom part
10 First coupling body
11 Second coupling body
12 Composite concrete part
13.1, 13.2, 13.3 Measuring point
14.1, 14.2 Securing element
15 Rotational axis
16 Measuring probe
17 Formwork
18 Conical catching area
19 Centering pin
20.1, 20.2 Receiver
21 Vertical direction
22 Centering bush
23.1, 23.2, 23.3 Tie rods
24 First partial component
25 Second partial component
26 Anti-rotation device
27.1, 27.2 Longitudinal axis
28 Rotational axis

The invention claimed is:

1. A method for erecting a tidal power plant, the tidal power plant including a turbine which revolves on a carrying element, and a foundation structure on which the carrying element rests on at least one coupling apparatus, with an upper part of the coupling apparatus which is part of the carrying element being in operative connection in the mounted state with a bottom part of the coupling apparatus which is part of the foundation structure, the method comprising:

erecting the foundation structure with the bottom part of the coupling apparatus at the place of installation of the tidal power plant;

measuring the orientation of the bottom part of the coupling apparatus;

individual adjustment of the carrying element with the upper part of the coupling apparatus in its entirety to the measured orientation of the bottom part of the coupling apparatus, and setting down the carrying element on the foundation structure and producing an operative connection between the upper part of the coupling apparatus and the bottom part of the coupling apparatus;

wherein the carrying element comprises a first partial component and a second partial component which are spaced from the upper part of the coupling apparatus and are oriented relative to one another for individual adjustment of the carrying element in such a way that their longitudinal axes assume a predetermined relative angle, with the coupling apparatus comprising an anti-rotation device for fixing the angular position of the upper part relative to the bottom part relating to a rotational axis of the coupling apparatus, and wherein the connection of the first partial component with the second partial component of the carrying element is arranged as a composite concrete part.

2. The method according to claim 1, wherein the upper part of the coupling apparatus is individually adjusted for the adjustment of the carrying element to the measured orientation of the bottom part of the coupling apparatus.

3. The method according to claim 2, wherein the upper part of the coupling apparatus comprises a first coupling body which is connected with a predetermined orientation with the further components of the carrying element for the adjustment of the carrying element to the measured orientation of the bottom part.

4. The method according to claim 3, wherein the first coupling body is cast into a composite concrete part.

5. The method according to claim 1, wherein the entire carrying element is arranged as a composite concrete part.

6. The method according to claim 5, wherein the composite concrete part is made of seawater-proof concrete.

7. The method according to claim 5, wherein the composite concrete part is fiber-reinforced.

8. The method according to claim 1, wherein the composite concrete part is made of seawater-proof concrete.

9. The method according to claim 8, wherein the composite concrete part is fiber-reinforced.

10. The method according to claim 1, wherein the composite concrete part is fiber-reinforced.

11. The method according to claim 1, wherein the composite concrete part is pretensioned.

12. The method according to claim 1, wherein the measurement of the orientation of the bottom part of the coupling apparatus is performed by means of measuring points which are attached to the foundation structure and whose positions are known.

13. A method for erecting a tidal power plant, the tidal power plant including a turbine which revolves on a carrying element, and a foundation structure on which the carrying element rests on at least one coupling apparatus, with an upper part of the coupling apparatus which is part of the carrying element being in operative connection in the mounted state with a bottom part of the coupling apparatus which is part of the foundation structure, the method comprising:
erecting the foundation structure with the bottom part of the coupling apparatus at the place of installation of the tidal power plant;
measuring the orientation of the bottom part of the coupling apparatus;
individual adjustment of the carrying element with the upper part of the coupling apparatus in its entirety to the measured orientation of the bottom part of the coupling apparatus, and
setting down the carrying element on the foundation structure and producing an operative connection between the upper part of the coupling apparatus and the bottom part of the coupling apparatus;
wherein the upper part of the coupling apparatus is individually adjusted for the adjustment of the carrying element to the measured orientation of the bottom part of the coupling apparatus, wherein the upper part of the coupling apparatus comprises a first coupling body which is connected with a predetermined orientation with the further components of the carrying element for the adjustment of the carrying element to the measured orientation of the bottom part, and wherein the first coupling body is cast into a composite concrete part.

14. The method according to claim 13, wherein the entire carrying element is arranged as a composite concrete part.

15. The method according to claim 14, wherein the composite concrete part is made of seawater-proof concrete.

16. The method according to claim 14, wherein the composite concrete part is fiber-reinforced.

17. The method according to claim 13, wherein the composite concrete part is made of seawater-proof concrete.

18. The method according to claim 17, wherein the composite concrete part is fiber-reinforced.

19. The method according to claim 13, wherein the composite concrete part is fiber-reinforced.

20. A method for erecting a tidal power plant, the tidal power plant including a turbine which revolves on a carrying element, and a foundation structure on which the carrying element rests on at least one coupling apparatus, with an upper part of the coupling apparatus which is part of the carrying element being in operative connection in the mounted state with a bottom part of the coupling apparatus which is part of the foundation structure, the method comprising:
erecting the foundation structure with the bottom part of the coupling apparatus at the place of installation of the tidal power plant;
measuring the orientation of the bottom part of the coupling apparatus;
individual adjustment of the carrying element with the upper part of the coupling apparatus in its entirety to the measured orientation of the bottom part of the coupling apparatus such that a centerline of the upper part of the coupling apparatus is offset at an angle with respect to a centerline of a support pillar of the carrying element, and
setting down the carrying element on the foundation structure and producing an operative connection between the upper part of the coupling apparatus and the bottom part of the coupling apparatus.

* * * * *